United States Patent
King et al.

(10) Patent No.: US 8,051,153 B2
(45) Date of Patent: Nov. 1, 2011

(54) SWITCH APPARATUS FOR A REMOTE BOOT SEQUENCE OF A NETWORK DEVICE

(75) Inventors: Ku-Jei King, Taipei (TW); MW Wang, Dali (TW); Kelvin WP Huang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 12/268,073

(22) Filed: Nov. 10, 2008

(65) Prior Publication Data

US 2009/0132686 A1 May 21, 2009

(30) Foreign Application Priority Data

Nov. 20, 2007 (TW) ................ 96143972 A

(51) Int. Cl.
*G06F 15/16* (2006.01)

(52) U.S. Cl. .................................. 709/222
(58) Field of Classification Search .............. None
See application file for complete search history.

(56) References Cited

U.S. PATENT DOCUMENTS

| | | | |
|---|---|---|---|
| 5,432,927 A | 7/1995 | Grote et al. | |
| 5,471,674 A * | 11/1995 | Stewart et al. | 713/2 |
| 5,987,605 A * | 11/1999 | Hill et al. | 713/2 |
| 6,079,016 A | 6/2000 | Park | |
| 6,205,208 B1 * | 3/2001 | Detlefsen et al. | 379/93.05 |
| 2003/0212842 A1* | 11/2003 | Ferguson | 710/62 |
| 2005/0160256 A1* | 7/2005 | Huang et al. | 713/2 |
| 2007/0162622 A1 | 7/2007 | Lee | |
| 2007/0168905 A1* | 7/2007 | Bromley et al. | 717/100 |
| 2008/0126627 A1* | 5/2008 | Chandrasekhar et al. | 710/62 |

* cited by examiner

*Primary Examiner* — Ario Etienne
*Assistant Examiner* — Clayton R Williams
(74) *Attorney, Agent, or Firm* — Adam M. Steadman; Thomas E. Tyson

(57) ABSTRACT

A switch apparatus for a remote boot sequence of a network device is disclosed. The network device may comprise a processor and a network control circuit. The switch apparatus may comprise a first storage element for storing a first boot code, a second storage element for storing a second boot code, and a detect and switch circuit electrically connected to the network control circuit. The detect and switch circuit may selectively connect to one of the first storage element and the second storage element in response to whether there is a detected signal of a pluggable unit inserted into said network device, so that the processor executes the remote boot sequence in accordance with the boot code stored in the selected storage element.

23 Claims, 4 Drawing Sheets

SWITCH APPARATUS FOR A REMOTE BOOT SEQUENCE OF A NETWORK DEVICE

RELATED APPLICATION

This application claims priority under 35 U.S.C. §119 to Taiwanese Patent Application No. 96143972 filed Nov. 20, 2007, the entire text of which is specifically incorporated by reference herein.

FIELD OF THE INVENTION

The various embodiments described herein relate to a network device and more specifically to a switch apparatus for a remote boot sequence of a network device.

BACKGROUND OF THE INVENTION

In this blooming internet era, network computer systems, such as servers, are widely used. Via server management technology, the data and information thereof are properly collected and managed.

Remote control is an important issue of server management technology. The server is remotely controlled via the internet, and consequently cost is lowered and performance is improved. In response to various needs and environments, several remote server management technologies have been developed, such as the IPMI (Intelligent Platform Management Interface) standard, the MII (Medium Independent Interface) standard, and the RMII (Reduced Media Independent Interface) standard. In fact, in remote server management technology, under various environments, the processes and contents thereof are distinct.

A blade server is a fast developing server architecture that has been developed to bundle server components into a compact operating unit. A blade server may be a high-density, rack-mounted packaging architecture for servers that provides input/output (I/O), systems management, and power to individual blades. For example, the blade server IBM BladeCenter™ provides advanced system management functions, such as Advanced Management Module (AMM) and Baseboard Management Controller (BMC). These functions are suitable for remote control technology.

AMM allows a user to simultaneously control a plurality of blades within the cabinet of the blade server. A cKVM I/O card (i.e., concurrent keyboard, video, and mouse input/output card) is used to simulate the keyboard, the mouse, and the storage (e.g., FDD and HDD). When a cKVM I/O card is installed in the blade server by a user, the user then may have the ability to remotely control the blades in the cabinet.

Generally, the boot code for a remote boot process of a blade depends on whether the cKVM I/O card is installed. For example, an IPMI boot code is usually used when the cKVM I/O card is not installed. On the other hand, when the cKVM I/O card is installed, other boot code, such as an UMP (Universal Management Port) code, may be used.

In the field of blade server technology, some solutions have been developed in the state of the art. For example, one solution is to give up cKVM I/O card support and remote control functionality. Although such solution may effectively control the manufacturing cost, the function of supporting cKVM I/O is lost. The other solution is to have the manufacturer refresh the boot code to be UMP code when the cKVM I/O card is installed. Such solution may control the manufacturing cost, and the cKVM I/O card may be well supported. However, to the manufacturers, the manufacturing process and the arrangement of the user required by such solution are relatively complicated.

SUMMARY OF THE INVENTION

The various embodiments described herein may provide a switch apparatus for a remote boot sequence of a network device under various software and hardware environments. The various embodiments may provide a switch apparatus for a remote boot sequence of a network chip of a network device through a network. Moreover, the various embodiments may provide a remote boot technology of a network device with low-cost manufacturing, full functionality, and a smaller size.

A first general aspect of the various embodiments provides a switch apparatus for a remote boot sequence of a network device. The network device may comprise a processor and a network control circuit. The switch apparatus may comprise:
  a first storage element for storing a first boot code;
  a second storage element for storing a second boot code; and
  a detect and switch circuit electrically connected to the network control circuit.

The detect and switch circuit may selectively electrically connect to one of the first storage element and the second storage element in response to whether there is a detected signal of a pluggable unit (e.g., a feature card) inserted into the network device. The processor may execute the remote boot sequence in accordance with the boot code stored in the selected storage element.

The detect and switch circuit may electrically connect to the second storage element if there is a detected signal of a pluggable unit inserted into the network device. The detect and switch circuit may electrically connect to the first storage element if there is no detected signal of a pluggable unit inserted into the network device.

The detect and switch circuit may comprise a set of first transistors, a set of second transistors, and an inverter. Each first transistor may comprise an input terminal, an output terminal, and a control terminal. The input terminal of each first transistor may be electrically connected to the network control circuit, the output terminal of each first transistor may be electrically connected to the first storage element, and the control terminal of each first transistor may be electrically connected to a socket. The socket may permit insertion of a pluggable unit into the network device. Each second transistor may comprise an input terminal, an output terminal, and a control terminal. The input terminal of each second transistor may be electrically connected to the network control circuit, and the output terminal of each second transistor may be electrically connected to the second storage element. The inverter may be electrically connected to the socket and the control terminal of each second transistor.

A user may execute the remote boot sequence of the network device through a network. If there is a pluggable unit inserted into the network device, the detect and switch circuit may electrically connect to the second storage element so that the processor executes the remote boot sequence in accordance with the second boot code stored in the second storage element. If there is no pluggable unit inserted into the network device, the detect and switch circuit may electrically connect to the first storage element so that the processor executes the remote boot sequence in accordance with the first boot code stored in the first storage element.

The network control circuit may be a network control circuitry of a network chip, and the processor may be a network chip processor of a network chip. Alternatively, the network control circuit may be a network control circuitry of a southbridge, and the processor may be a network processor of a southbridge. The network device may be a server, a blade server, a workstation, a desktop computer, a notebook computer, or a personal digital assistant (PDA).

The first boot code may be an UMP code, an ASF 1.3 code, an ASF 2.0 code, or an IPMI code. The second boot code may be different from the first boot code. The second boot code may be an UMP code, an ASF 1.3 code, an ASF 2.0 code, or an IPMI code. The pluggable unit may be a feature card, an expansion card, or an option card. The pluggable unit may comprise a cKVM card. The first storage element may be a flash memory. The second storage element may be a flash memory. The first storage element may have an IPMI code, and the second storage element may have an UMP code.

A second general aspect of the various embodiments provides a network device. The network device may comprise:
 a network control circuit;
 a first storage element for storing a first boot code;
 a second storage element for storing a second boot code;
 a detect and switch circuit, electrically connected to the network control circuit, for selectively electrically connecting to one of the first storage element and the second storage element in response to whether there is a detected signal of a pluggable unit (e.g., a feature card) inserted into the network device;
 a processor, electrically connected to the network control circuit, for executing a remote boot sequence in accordance with the boot code stored in the selected storage element; and
 a socket permitting insertion of a pluggable unit into the network device.

The foregoing and other features will be apparent from the following detailed description of the various embodiments.

BRIEF DESCRIPTION OF THE DRAWINGS

The various embodiments will be described in detail, with reference to the following figures, wherein.

DETAILED DESCRIPTION

Figure 1:
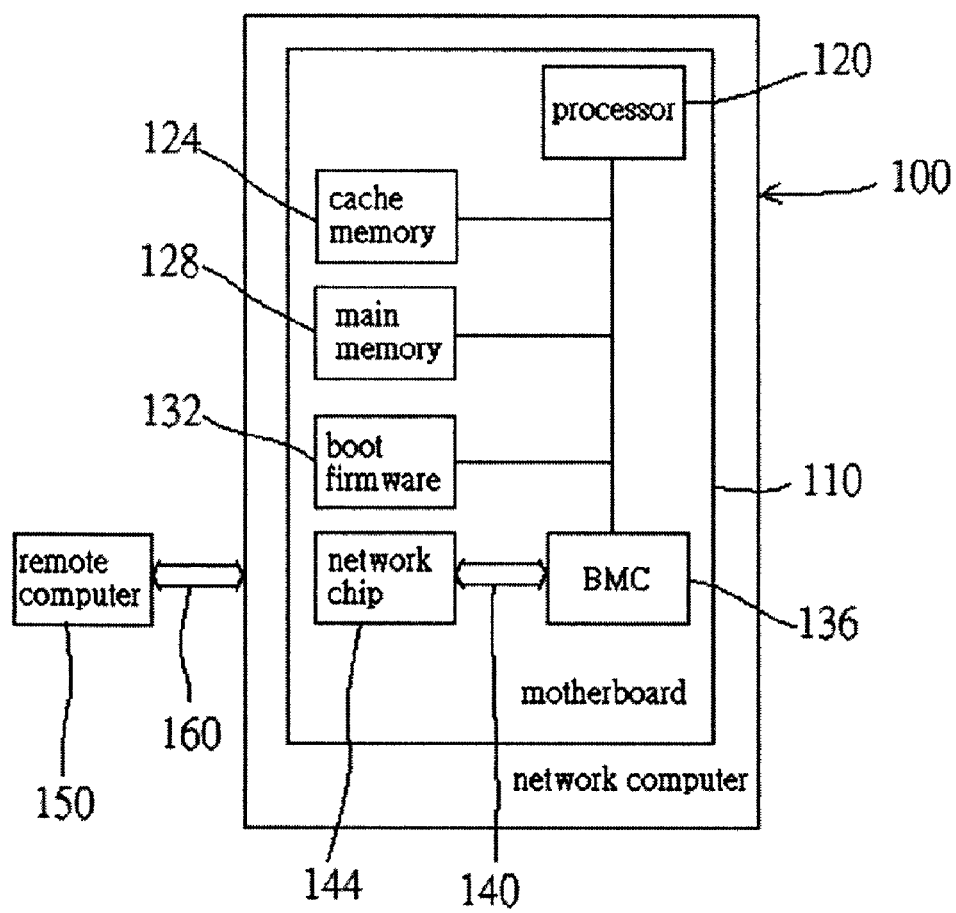
FIG. 1 illustrates a block diagram of a network device according to an exemplary embodiment.

FIG. 1 illustrates a block diagram of a network device 100 (e.g., a network computer such as a server blade), according to an exemplary embodiment. The network computer 100 may comprise a motherboard 110 and at least one processor 120 on the motherboard 110 for executing the program code instructions (e.g., BIOS instructions, operation system instructions, and application instructions). The processor 120 may be electrically connected to a cache memory 124, a main memory 128, and a system boot firmware 132. The network computer 100 also may comprise a baseboard management controller (BMC) 136, electrically connected to the processor 120, for communicating with a network chip 144 through a input/output interface 140. A remote computer 150 may control the network computer 100 through a network 160.

It should be noted that the various embodiments described herein are applicable to various information handling devices, such as a blade server, a server, a work station, a desktop computer, a notebook computer, and a personal digital assistant (PDA). Moreover, the various embodiments are applicable to peripheral devices, communication devices (such as mobile phones), and set-top boxes related to information handling devices.

Figure 2:
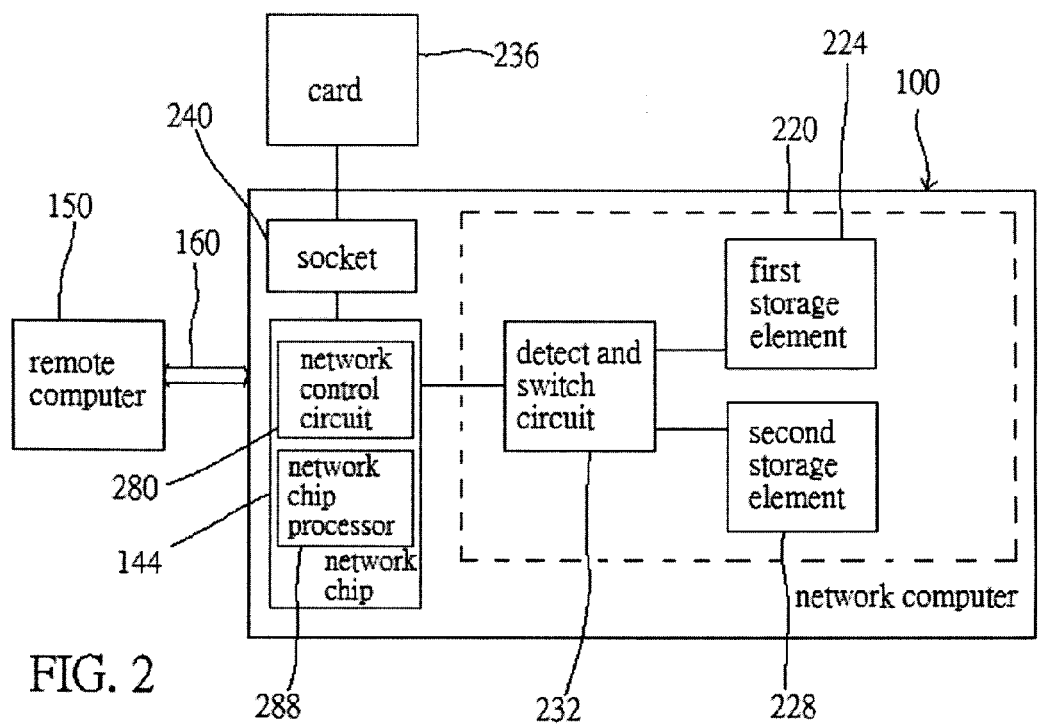
FIG. 2 illustrates a switch apparatus for a remote boot sequence of a network device according to an exemplary embodiment.

FIG. 2 illustrates an exemplary embodiment of the switch apparatus for a remote boot sequence of a network device (e.g., a network computer such as a server blade). A boot sequence switch apparatus 220 of a server blade 100 may comprise a first storage element 224 for storing a first boot code, such as an IPMI code; a second storage element 228 for storing a second boot code, such as an UMP code; and a detect and switch circuit 232. The detect and switch circuit 232 may be electrically connected to one of the first storage element 224 and the second storage element 228. The first storage element 224 may be a flash memory or other type of storage element. The second storage element 228 may be a flash memory or other type of storage element.

FIG. 2 also illustrates a network chip 144, a network 160, a remote computer 150, a socket 240, and a pluggable unit 236 such as a card to be inserted into the network computer. The card 236 may be a feature card, an expansion card, or an option card (such as a cKVM card). The network chip 144 may comprise a network control circuit 280 and a network chip processor 288. The network control circuit 280 may be used to convert logic signals to substantial electrical signals in a conventional way known in the art. The network chip processor 288 may be used to process signals for transmission or reception in a conventional way known in the art. In this exemplary embodiment, the network chip 144 may be a local area network control chip, such as an Ethernet network chip BCM5714S available from BroadCom Corporation. The network control circuit 280 may be a peripheral circuit of the network chip 144. The network chip processor 288 may be a processor of the network chip 144. The network chip 144 may also be an Ethernet network controller, such as Intel 82541 available from Intel Corporation. The socket 240 may be electrically connected to the network chip 144, which allows the card 236 to be inserted.

Figure 3:
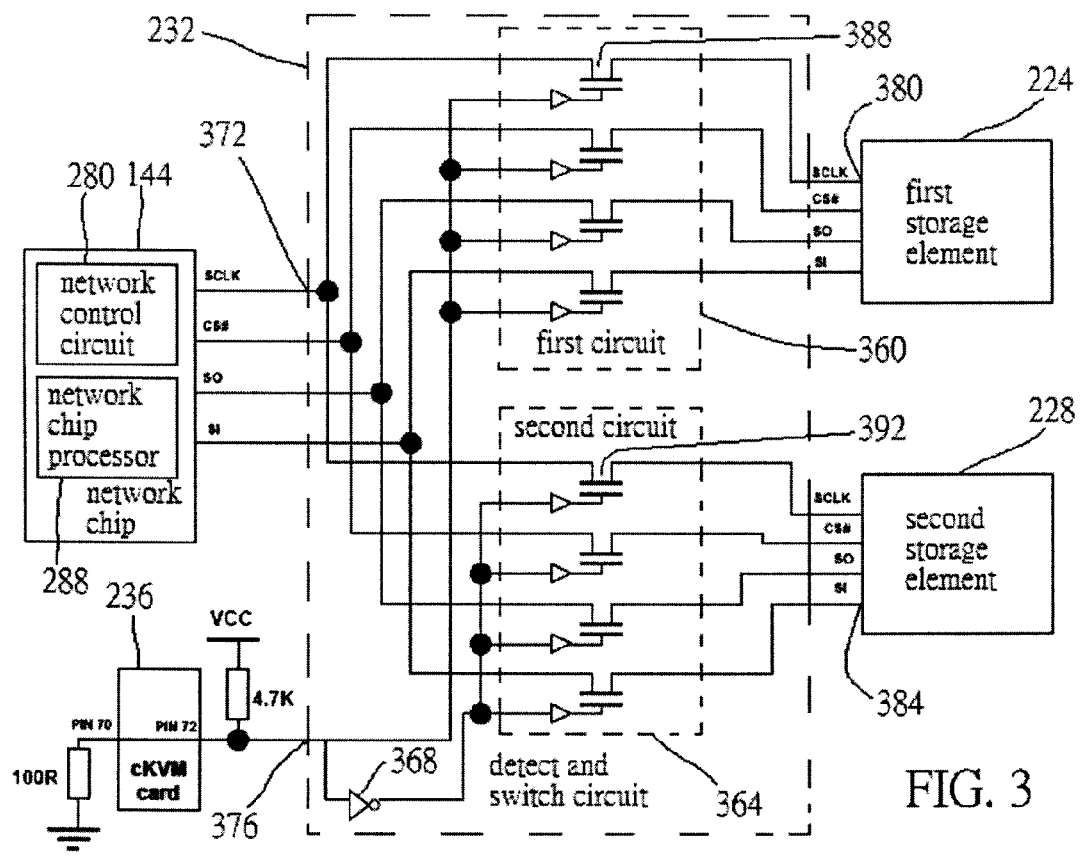
FIG. 3 schematically illustrates a detect and switch circuit according to an exemplary embodiment wherein a pluggable unit (such as a feature card) is inserted into a socket of the network device.

FIG. 3 illustrates an exemplary embodiment of the detect and switch circuit 232 when there is a card 236 (e.g., a feature card) inserted into the socket 240. The detect and switch circuit 232 may comprise a first circuit 360, a second circuit 364, and an inverter 368. FIG. 3 also illustrates a set of first terminals 372 electrically connected to the network control circuit 280 of the network chip 144, a second terminal 376 electrically connected to the card 236 via the socket 240 (FIG. 2), a set of third terminals 380 electrically connected to the first storage element 224, and a set of fourth terminals 384 electrically connected to the second storage element 228. The signals on the second terminal 376 and the inverted signals from the inverter 368 may be sent to the first circuit 360 and the second circuit 364 respectively.

Taking MOS transistors for example, the first circuit 360 may comprise a set of transistors 388, and the second circuit 364 may comprise a set of transistors 392. When the card 236 is inserted into the socket 240, the signal on the second terminal 376 is low, and thus the transistors 392 of the second circuit 364 are all "ON", and the transistors 388 of the first circuit 360 are all "OFF". As a result, the network control circuit 280 of the network chip 144 is electrically connected to the second storage element 228 through the transistor 392 of the second circuit 364, and thus the network chip processor 288 may use the second boot code (the UMP code) stored in the second storage element 228 to execute the boot sequence. The later steps after the above boot sequence may be completed in a conventional way known in the art. The above transistors may be junction type field effect transistors, metal-oxide-semiconductor field effect transistors, or complementary metal-oxide-semiconductor field effect transistors.

Figure 4:
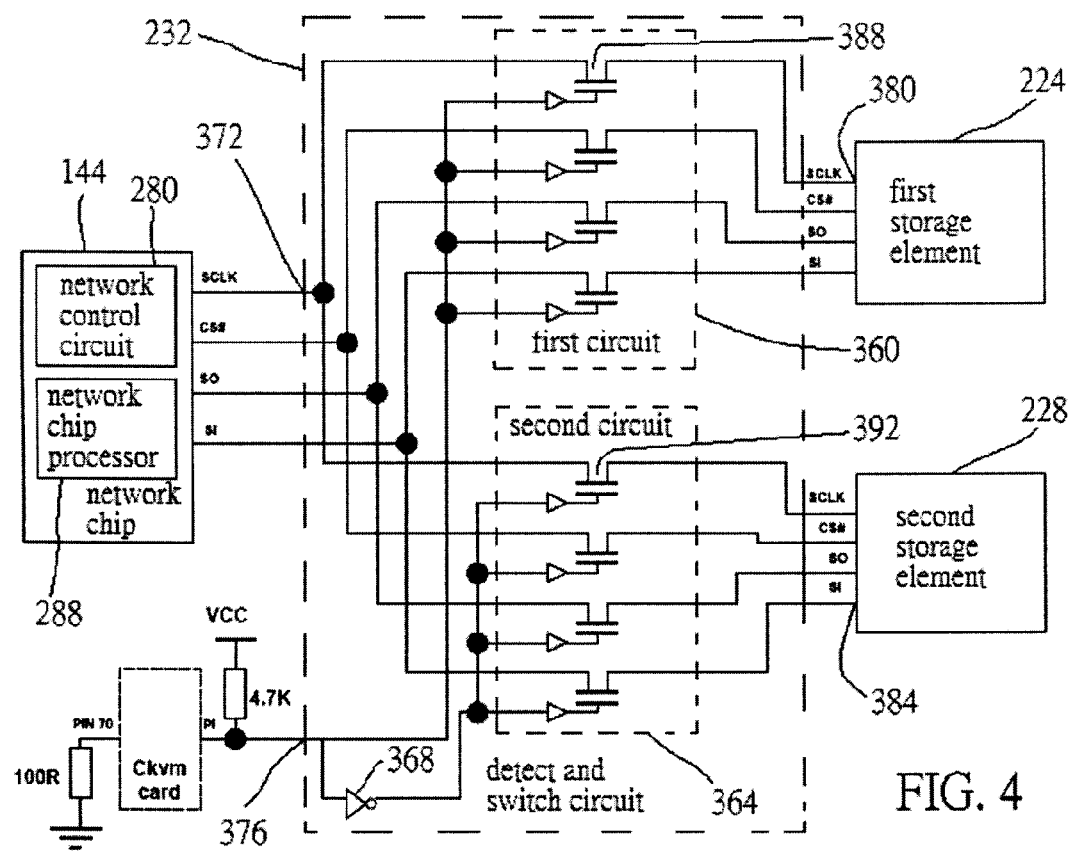
FIG. 4 schematically illustrates a detect and switch circuit according to an exemplary embodiment wherein there is no pluggable unit (such as a feature card) inserted into a socket of the network device.

FIG. 4 illustrates an exemplary embodiment of the detect and switch circuit 232, when there is no card inserted into the socket 240. The first circuit 360 may comprise a set of transistors 388, and the second circuit 364 may comprise a second set of transistors 392. When there is no card 236 inserted into the socket 240, the signal on the second terminal 376 is high, and thus the transistors 388 on the first circuit 360 are all "ON", and the transistors 392 of the second circuit 364 are all "OFF". As a result, the network control circuit 280 of the network chip 144 is electrically connected to the first storage element 224 through the transistor 388 of the first circuit 360, and thus the network chip processor 288 may use the first boot code (the IPMI code) stored in the second storage element 224 to execute the boot sequence. The later steps after the above boot sequence may be completed in a conventional way known in the art. The above transistors may be junction type field effect transistors, metal-oxide-semiconductor field effect transistors, or complementary metal-oxide-semiconductor field effect transistors.

In accordance with the previous explanation, the remote computer 150 may control the server blade 100 through the network 160. When the card 236 (e.g., a feature card such as a cKVM I/O card) is inserted into the socket 240 of the server blade 100, the detect and switch circuit 232 will automatically detect the existence of the card 236. In such case, the transistors 392 of the second circuit 364 will all be "ON", and the transistors 388 of the first circuit 360 will all be "OFF", and thus the network control circuit 280 of the network chip 144 is electrically connected to the second storage element 228. Consequently, the network chip processor 288 may use the UMP code stored in the second storage element 228 to execute a boot sequence of the network chip 144.

Conversely, when there is no card 236 inserted into the socket 240 of the server blade 100, the detect and switch circuit 232 will automatically detect that there is no feature card installed. In such case, the transistors 388 of the first circuit 360 will all be "ON", and the transistors 392 of the second circuit 364 will all be "OFF", and thus the network control circuit 280 of the network chip 144 is electrically connected to the first storage element 224. Consequently, the network chip processor 288 may use the IPMI code stored in the first storage element 224 to execute a boot sequence of the network chip 144.

With respect to the various embodiments described herein, the first boot code is not limited to the IPMI code. In accordance with various software and hardware environments, the first boot code may be an UMP code, an ASF 1.3 code, or an ASF 2.0 code. Moreover, the second boot code is not limited to the UMP code. So long as the second boot code is different from the first boot code, the second boot code may be an ASF 1.3 code, an ASF 2.0 code, or an IPMI code. Furthermore, the detect and switch circuit is not limited to the circuits shown in FIG. 3 and FIG. 4. Any similar circuits may be applied so long as they have the functions explained previously. Further, the network control circuit is not limited to the network control circuit of the network chip, and the network chip processor is not limited to the network chip processor of the network chip. For example, the network control circuit may be a network control circuitry of a southbridge, and the processor may be a network processor of a southbridge. The card is not limited to a cKVM card; other card types may be used depending on various environments, such as cards suitable for iBMC firmware. The first storage element and the second storage element are not limited to a flash memory; rather, other types of memory devices may be used.

While this disclosure has been provided in conjunction with the exemplary embodiments outlined above, it is evident that many alternatives, modifications and variations will be apparent to those skilled in the art. Accordingly, the various embodiments described herein are intended to be illustrative, not limiting. Various modifications may be made without departing from the spirit and scope of the disclosure as defined in the following claims.

The invention claimed is:

1. A switch apparatus of a network device, said network device comprising a processor and a network control circuit, said switch apparatus comprising:
   a first storage element for storing a first boot code;
   a second storage element for storing a second boot code; and
   a detect and switch circuit, electrically connected to said network control circuit, for electrically connecting to said first storage element so that said processor executes a remote boot sequence in accordance with said first boot code upon determining that there is no detected signal of a network card enabling concurrent remote control of multiple network devices, and for electrically connecting to said second storage element so that said processor executes a remote boot sequence in accordance with said second boot code upon determining that there is a detected signal of a network card enabling concurrent remote control of multiple network devices.

2. The switch apparatus according to claim 1, wherein said network control circuit comprises a network control circuitry of a network chip, and wherein said processor comprises a network chip processor of a network chip.

3. The switch apparatus according to claim 1, wherein said network device is selected from a group comprising a server, a blade server, a workstation, a desktop computer, a notebook computer, and a personal digital assistant.

4. The switch apparatus according to claim 1, wherein said first boot code is an IPMI code, and wherein said second boot code is an UMP code.

5. The switch apparatus according to claim 1, wherein:
   a user executes said remote boot sequence of said network device through a network;
   if a network card enabling concurrent remote control of multiple network devices is inserted into said network device, said detect and switch circuit electrically connects to said second storage element so that said processor executes said remote boot sequence in accordance with said second boot code stored in said second storage element; and
   if no network card enabling concurrent remote control of multiple network devices is inserted into said network device, said detect and switch circuit electrically connects to said first storage element so that said processor executes said remote boot sequence in accordance with said first boot code stored in said first storage element.

6. The switch apparatus according to claim 1, wherein said first boot code is selected from a group comprising an UMP code, an ASF 1.3 code, an ASF 2.0 code, and an IPMI code, and wherein said second boot code is different from said first boot code and is selected from a group comprising an UMP code, an ASF 1.3 code, an ASF 2.0 code, and an IPMI code.

7. The switch apparatus according to claim 1, wherein said network card is selected from a group comprising a feature card, an expansion card, and an option card.

8. The switch apparatus according to claim 1, wherein said network card is a cKVM card.

9. The switch apparatus according to claim 1, wherein said first storage element comprises a flash memory and said second storage element comprises a flash memory.

10. The switch apparatus according to claim 1, wherein said network control circuit comprises a network control circuitry of a southbridge, and wherein said processor comprises a network processor of a southbridge.

11. The switch apparatus according to claim 1, wherein said detect and switch circuit comprises:
  a set of first transistors, each having an input terminal, an output terminal, and a control terminal, wherein said input terminal of each first transistor is electrically connected to said network control circuit, said output terminal of each first transistor is electrically connected to said first storage element, and said control terminal of each first transistor is electrically connected to a socket, said socket permitting insertion of a network card enabling concurrent remote control of multiple network devices into said network device;
  a set of second transistors, each having an input terminal, an output terminal, and a control terminal, wherein said input terminal of each second transistor is electrically connected to said network control circuit and said output terminal of each second transistor is electrically connected to said second storage element; and
  an inverter electrically connected to said socket and said control terminal of each second transistor.

12. A network device comprising:
  a network control circuit;
  a processor, electrically connected to said network control circuit, for executing a remote boot sequence;
  a first storage element for storing a first boot code;
  a second storage element for storing a second boot code; and
  a detect and switch circuit, electrically connected to said network control circuit, for electrically connecting to said first storage element so that said processor executes a remote boot sequence in accordance with said first boot code upon determining that there is no detected signal of a network card enabling concurrent remote control of multiple network devices, and for electrically connecting to said second storage element so that said processor executes a remote boot sequence in accordance with said second boot code upon determining that there is a detected signal of a network card enabling concurrent remote control of multiple network devices.

13. The device according to claim 12, further comprising a socket permitting insertion of a network card enabling concurrent remote control of multiple network devices into said network device.

14. The device according to claim 12, wherein said network control circuit comprises a network control circuitry of a network chip, and wherein said processor comprises a network chip processor of a network chip.

15. The device according to claim 12, wherein said network device is selected from a group comprising a server, a blade server, a workstation, a desktop computer, a notebook computer, and a personal digital assistant.

16. The device according to claim 12, wherein said first boot code is an IPMI code, and wherein said second boot code is an UMP code.

17. The device according to claim 12, wherein:
  a user executes said remote boot sequence of said network device through a network;
  if a network card enabling concurrent remote control of multiple network devices is inserted into said network device, said detect and switch circuit electrically connects to said second storage element so that said processor executes said remote boot sequence in accordance with said second boot code stored in said second storage element; and
  if no network card enabling concurrent remote control of multiple network devices is inserted into said network device, said detect and switch circuit electrically connects to said first storage element so that said processor executes said remote boot sequence in accordance with said first boot code stored in said first storage element.

18. The device according to claim 12, wherein said first boot code is selected from a group comprising an UMP code, an ASF 1.3 code, an ASF 2.0 code, and an IPMI code, and wherein said second boot code is different from said first boot code and is selected from a group comprising an UMP code, an ASF 1.3 code, an ASF 2.0 code, and an IPMI code.

19. The device according to claim 12, wherein said network card is selected from a group comprising a feature card, an expansion card, and an option card.

20. The device according to claim 12, wherein said network card is a cKVM card.

21. The device according to claim 12, wherein said first storage element comprises a flash memory and said second storage element comprises a flash memory.

22. The device according to claim 12, wherein said network control circuit comprises a network control circuitry of a southbridge, and wherein said processor comprises a network processor of a southbridge.

23. The device according to claim 13, wherein said detect and switch circuit comprises:
  a set of first transistors, each having an input terminal, an output terminal, and a control terminal, wherein said input terminal of each first transistor is electrically connected to said network control circuit, said output terminal of each first transistor is electrically connected to said first storage element, and said control terminal of each first transistor is electrically connected to said socket;
  a set of second transistors, each having an input terminal, an output terminal, and a control terminal, wherein said input terminal of each second transistor is electrically connected to said network control circuit and said output terminal of each second transistor is electrically connected to said second storage element; and
  an inverter electrically connected to said socket and said control terminal of each second transistor.

* * * * *